April 21, 1970 R. C. BRAMMER 3,507,515
FOLDABLE BUMPER STEPS

Filed Sept. 5, 1968 3 Sheets-Sheet 1

INVENTOR
ROBERT C. BRAMMER
BY Price, Heneveld, Huizenga & Cooper
ATTORNEYS

April 21, 1970   R. C. BRAMMER   3,507,515
FOLDABLE BUMPER STEPS

Filed Sept. 5, 1968   3 Sheets-Sheet 2

INVENTOR
ROBERT C. BRAMMER
BY Price, Heneveld, Huizenga & Cooper
ATTORNEYS

April 21, 1970  R. C. BRAMMER  3,507,515
FOLDABLE BUMPER STEPS
Filed Sept. 5, 1968  3 Sheets-Sheet 3
FIG 6
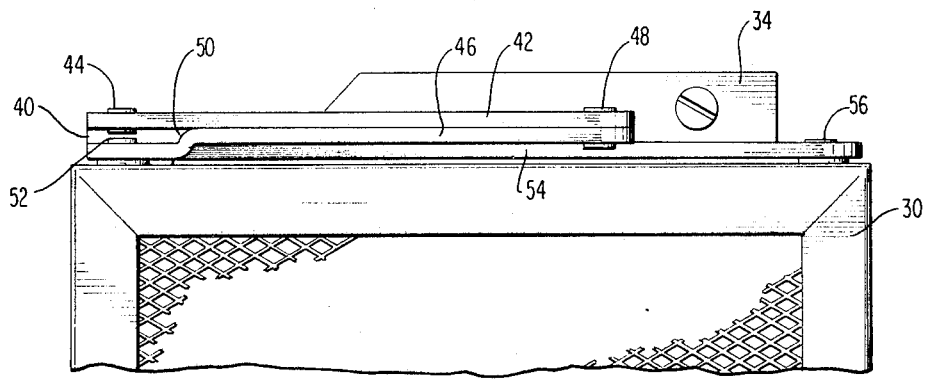
FIG 7
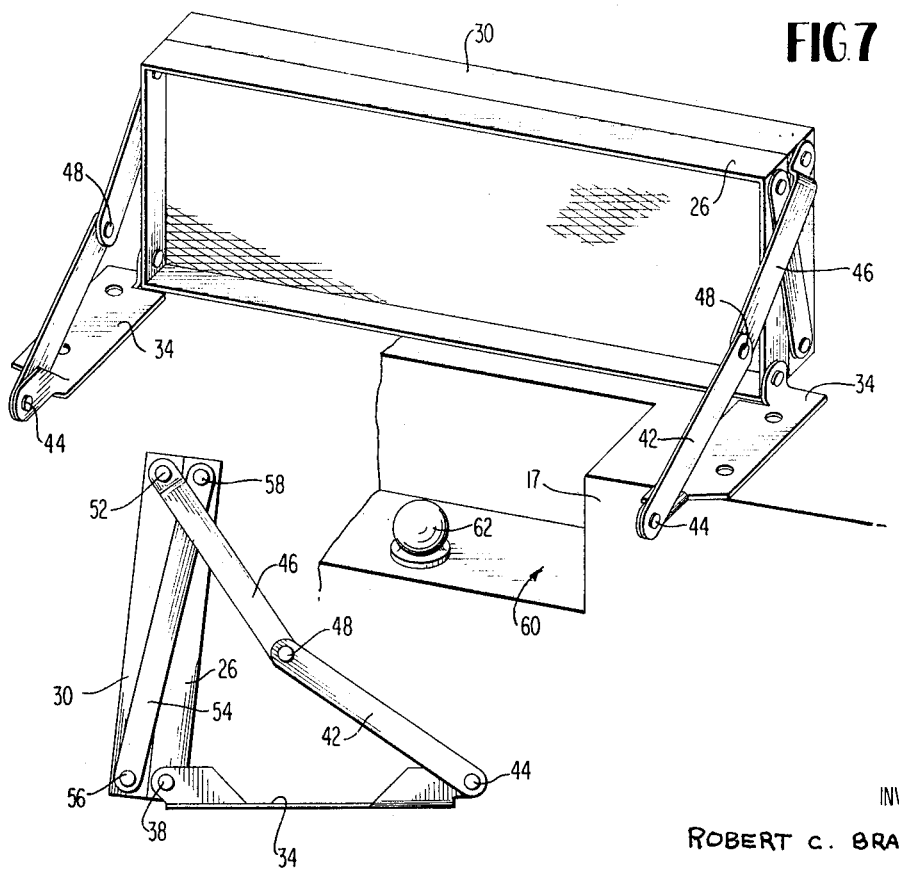
FIG 8
INVENTOR
ROBERT C. BRAMMER
BY Price, Heneveld, Huizenga & Cooper
ATTORNEYS

United States Patent Office 3,507,515
Patented Apr. 21, 1970

3,507,515
FOLDABLE BUMPER STEPS
Robert C. Brammer, Traverse City, Mich., assignor to Stromberg-Carlson Products, Inc., Traverse City, Mich., a corporation of Michigan
Filed Sept. 5, 1968, Ser. No. 757,580
Int. Cl. B60r 3/02, 19/02
U.S. Cl. 280—166                              9 Claims

ABSTRACT OF THE DISCLOSURE

This disclosure relates to foldable bumper steps for the back of pickup campers for example. First and second steps are fixed together so that the second step will be spaced forwardly and downwardly of a first step in a first position, so that the second step overlies and is adjacent to the first step in a second position, and so that both steps can be raised above the bumper to a third position when access is desired to a trailer hitch below the first step.

This invention relates to foldable bumper steps adapted to be fixed on the back bumper of a pickup camper and the like and foldable to a plurality of positions when not in use.

Pickup campers have become popular for those who like to travel and camp, and who can also use a pickup truck in the off season. The pickups have a bumper with a horizontal surface which is too high to use an initial step when entering the camper unit.

It is desirable to have steps on the back of the camper or pickup in which at least one step is lower than the bumper and which steps are foldable to a position above the bumper when not in use.

Pickup campers are also provided with a trailer hitch in a recessed central portion. The steps desirably fit over the top of the trailer hitch. The steps therefore must be movable in such a way that access can be obtained to the trailer hitch when it is desirable to use the same.

I have now discovered a novel step unit which can be fixed to pickup bumpers wherein the steps are foldable to a position on top of the bumper when not in use and to a third position providing access to a trailer hitch when desirable.

By various aspects of this invention, one or more of the following, or other, objects can be obtained.

It is an object of this invention to provide a foldable step unit for camper pickups and the like which is attachable directly to the bumper of a camper pickup truck.

It is a further object of this invention to provide a foldable two step bumper unit which is foldable to a position wherein one step overlies the other step when not in use.

It is a further object of this invention to provide a two step bumper unit which is foldable to a position wherein one step overlies the other when not in use and both steps are rotatable away from a front portion of the bumper to permit access to a trailer hitch when desirable.

Other aspects, objects, and the several advantages of this invention are apparent to one skilled in the art from a study of this disclosure, the drawings, and the appended claims.

According to the invention, there is provided a foldable step unit for a pickup camper truck and the like. The step unit has first and second step means, each step having a flat upper surface, a back, a front and opposite sides. Means at the step sides are provided to connect the steps to each other so that in a first position, the steps are vertically spaced from each other with the second step positioned forwardly of the first step and, in a second position, the steps are vertically adjacent each other with the second step overlying the first step. Means are provided for fixing the first step to the bumper surface.

Preferably, means are also provided for rotatably fixing the first step to the bumper at a back portion thereof so as to permit rotation of the first and second steps about a back portion of the bumper when the steps are in the second position.

The invention will now be described with reference to the accompanying drawings in which:

FIG. 6 is a partial plan view of the folded steps shown in FIGS. 4 and 5;

FIG. 7 is a front perspective view of the novel bumper steps shown in the raised position to permit access to a trailer hitch; and FIG. 8 is a side elevational view of the folded and raised bumper steps shown in FIG. 7.

Figure 1:
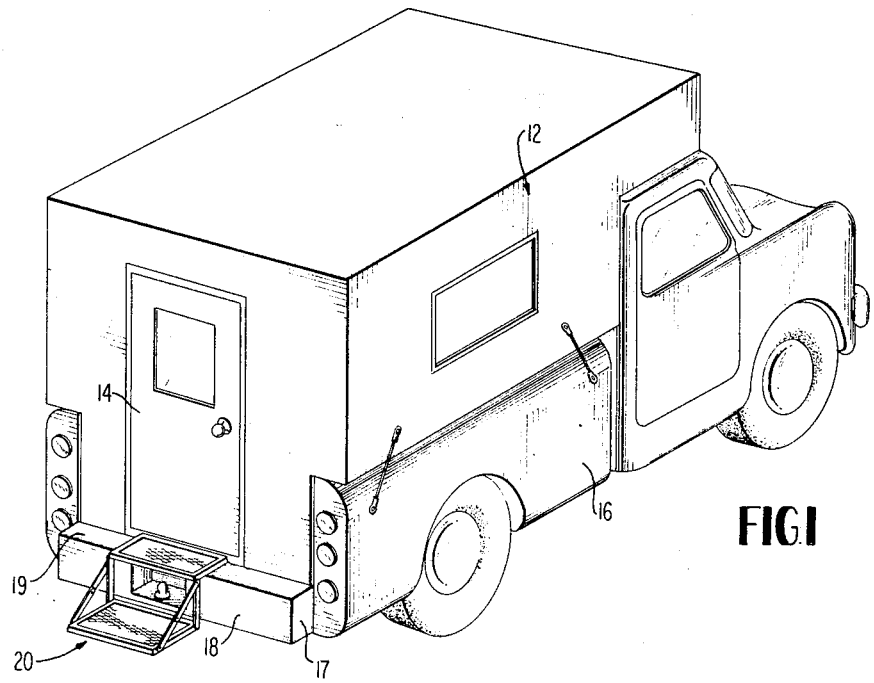
FIG. 1 is a perspective view of the folding steps positioned on the rear bumper of a pickup truck having a camper unit fixed on it.

Referring now to the drawings, a camper unit 12 having a door 14 is fixed on top of a pickup truck 16. The truck has a rear bumper 17 with a vertical surface 18 and a top flat surface 19. Foldable steps 20 are fixed to the rear bumper 17.

The foldable steps 20 comprise a top step 22 and a bottom step 24. The top step is formed from an outer frame 26 and a central grid area 28. The bottom step is formed from an outer frame 30 and a central grid area 32.

The steps are fixed to the bumper through a flat mounting plate 34 which is bolted directly to the top flat surface 19 of the rear bumper 17. The flat mounting plate 34 has an upwardly extending flange 36 at one end thereof through which it is pivotably secured to the inner end of frame 26 through pin 38. The flat mounting plate 34 has an upwardly extending flange 40 at a front outer portion which is spaced laterally of the edge of frame 26. A first link 42 is pivotably secured at one end to the upwardly extending flange 40 through a pin 44. A second link 46 is pivotably secured at one end to the other end of the first link 42 through pin 58 and is secured to the front portion of frame 30 through pin 52. The second link 46 extends outwardly of the frame 30 at 50.

A third link 54 is pivotably secured at one end to the outer end of frame 26 through pin 58 and at the other end to the inner end of the outer frame 30 through pin 56. When the steps are in the position shown in FIGS. 1 through 6, the pin 58 will be spaced laterally inwardly of the pin 44.

The bumper 17 has a recessed area 60 and a trailer hitch 62, both of which are conventional in pickup camper units.

As seen in FIG. 6, the third link 54 lies in a plane closest to the sides of the outer frames 26 and 30. The largest portion of the second link 46 lies in a plane adjacent the plane of the third link 54. The first link 42 lies in a plane outwardly of the second link 46. In other words, the plane of the second link 46 lies between the plane of the first link 42 and the plane of the third link 54. By this construction the pin 48 can rotate past the third link 54 (and vice versa) without interference.

The second link 46 has been shown with an outwardly bent portion 50 near its point of attachment to frame 30. It is, however, within the scope of the invention to make link 46 straight and to space it outwardly of the frame 30 with washers.

Figure 2:
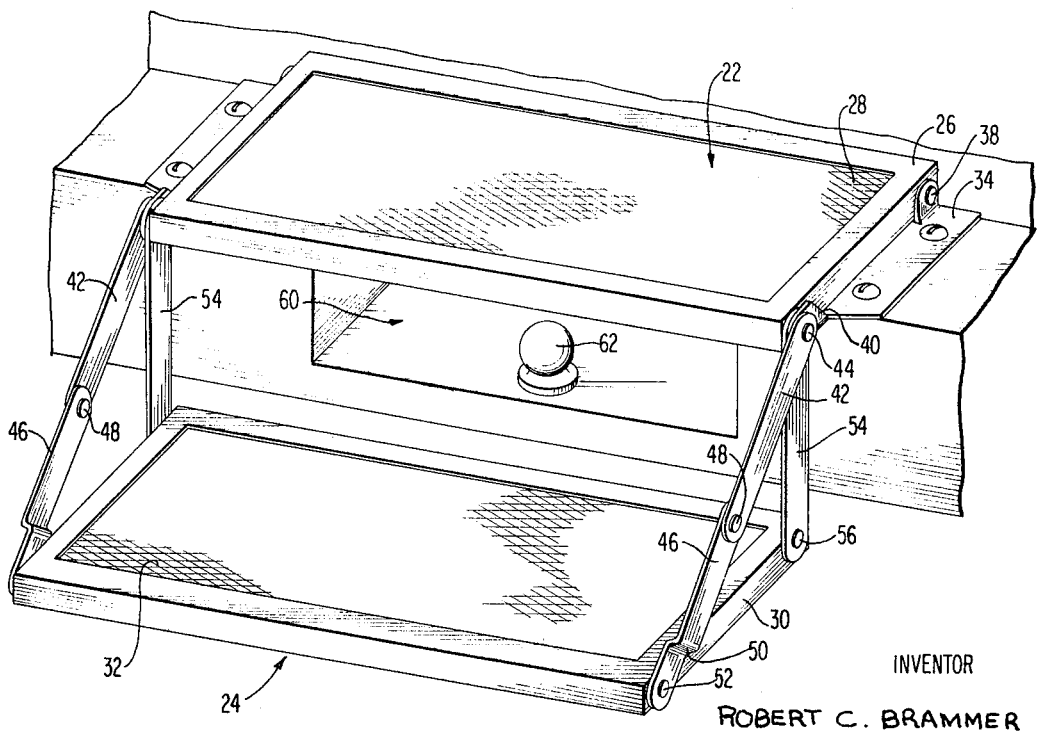
FIG. 2 is a front perspective view of the bumper steps in the normal position for use.
Figure 3:
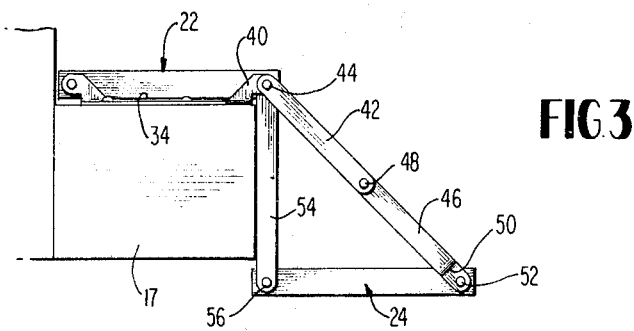
FIG. 3 is a side elevational view of the bumper steps in the position shown in FIG. 2.

In operation, the foldable steps are normally in the position shown in FIGS. 1, 2, and 3. When it is desirable to fold up the steps, the top step 22 is rotated counterclockwise about pin 38 to permit the link 54 to begin to rotate in a counterclockwise direction about pin 58 as viewed in FIG. 3. After pin 56 has rotated past pin 48, the linkages 42 and 46 can begin to fold inwardly as the bottom step 24 begins to fold downwardly on the top step 40. Both steps are then pushed flat against the bumper as illustrated in FIGS. 4, 5, and 6.

Figure 4:
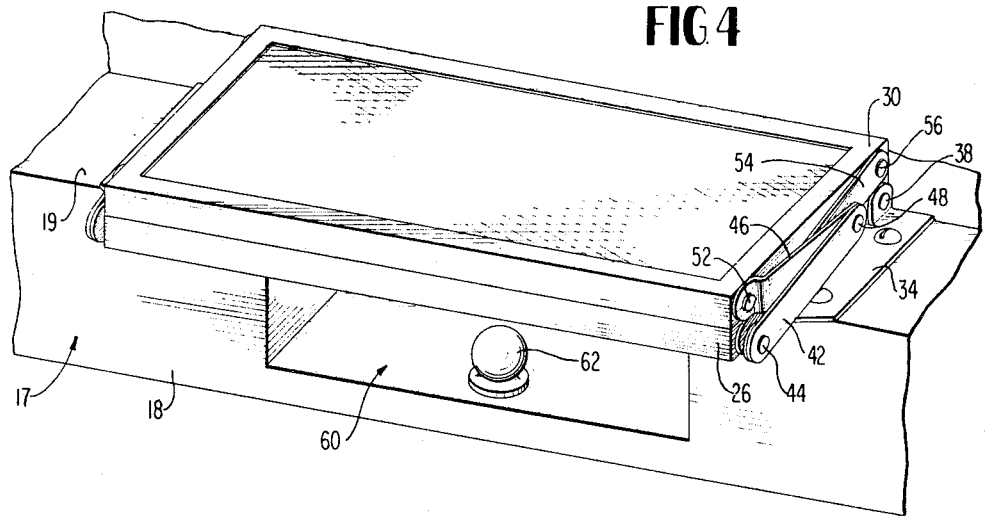
FIG. 4 is a front perspective view of the bumper steps shown in FIGS. 1 through 3 with the steps in a folded position.
Figure 5:
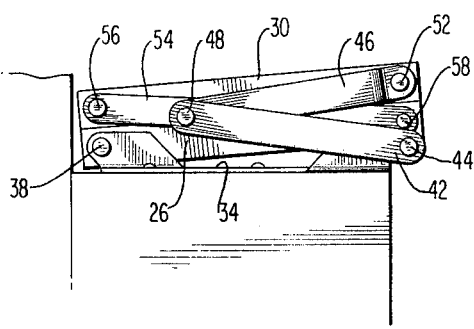
FIG. 5 is a side elevational view of the bumper steps in the folded position shown in FIG. 4.

When it is desirable to use the trailer hitch 62, the steps are merely pushed upwardly from the position shown in FIGS. 4, 5, and 6 to the position shown in FIG. 7. In this operation, the bottom step 24 will rotate counterclockwise about pin 38 which is fixed to the upwardly extending flange 36 of the stationary flat mounting plate 34.

In the foregoing description, only one set of linkages has been described. The opposite side of the bumper steps contain a linkage which is the mirror image of the described linkage.

Reasonable variation and modification are possible within the scope of the foregoing disclosure and the drawings without departing from the spirit of the invention.

The embodiments of the invention in which an exclusive property or privilege is claimed are defined as follows.

1. A foldable step unit for a truck and the like having a back bumper, said step unit comprising:
   first and second step means, each step means having a flat upper surface, a back, a front, and opposite slides;
   means at said step sides connecting said steps to each other so that in a first position said steps are vertically spaced from each other and said second step is positioned beneath and forwardly of said first step, and in a second position said steps are vertically stacked adjacent each other with said second step overlying said first step with both said first and second step being disposed substantially horizontal; and
   means for fixing said first step to a top portion of said bumper, whereby said step unit can also be used as a step when said steps are vertically stacked with said second step overlying said first step and substantially horizontal with respect to said bumper.

2. A foldable step unit according to claim 1 wherein said means for affixing said first step to said bumper surface is rotatably fixed to said first step at a back portion thereof so as to permit rotation of said first and second steps about a rear portion of said first step when said steps are in said second position.

3. A foldable step unit according to claim 2 wherein said means connecting said steps to each other comprises:
   a first link rotatably fixed at one end to said means for fixing said first step to said bumper surface;
   a second link rotatably fixed at one end to the other end of said first link, and at the other end, rotatably secured to a front side portion of said second step; and
   a third link rotatably fixed at one end to a front side portion of said first step and rotatably fixed at another end to a back side portion of said second step.

4. A foldable step unit according to claim 3 wherein at least a portion of said second link is spaced outwardly of said third link and said first link is spaced laterally outwardly of said second and third link to permit rotational movement of said third link relative to said first and second links without interference from said first and second links.

5. A foldable step unit according to claim 2 wherein said means for affixing said first step to said bumper surface comprises: a horizontal plate member having a first upwardly extending flange at a back portion thereof, said plate member being rotatably fixed to said first step through said first upwardly extending flange; a second upwardly extending flange at a front portion of said plate member, said second upwardly extending flange being spaced laterally outwardly of said first step side and said means connecting said steps includes linkage means fixed to said second upwardly extending flange and to said second step.

6. A foldable step unit according to claim 5 wherein said means connecting said steps to each other comprise:
   a first link rotatably fixed at one end to said means for fixing said first step to said bumper surface;
   a second link rotatably fixed at one end to the other end of said first link, and at the other end, rotatably secured to a front side portion of said second step; and
   a third link rotatably fixed at one end to a front side portion of said first step and rotatably fixed at another end to a back side portion of said second step.

7. A foldable step unit according to claim 6 wherein said third link lies in a plane closest to the sides of said first and second steps; said first link lies in a plane spaced laterally outwardly of said step sides; and at least a portion of said second link lies in a plane spaced laterally between the plane of said first link and the plane of said third link.

8. A foldable step unit according to claim 1 wherein said means connecting said steps to each other comprise:
   a first link rotatably fixed at one end to said means for fixing said first step to said bumper surface;
   a second link rotatably fixed at one end to the other end of said first link, and at the other end, rotatably secured to a front side portion of said second step; and
   a third link rotatably fixed at one end to a front side portion of said first step and rotatably fixed at another end to a back side portion of said second step.

9. A foldable step unit according to claim 3 wherein at least a portion of said second link is spaced outwardly of said third link and said first link is spaced laterally outwardly of said second and third link to permit rotational movement of said third link relative to said first and second links without interference from said first and second links.

References Cited

UNITED STATES PATENTS 3,394,947  7/1968  Strube _____ 280—166

FOREIGN PATENTS 254,090  7/1926  England.

BENJAMIN HERSH, Primary Examiner

R. R. SONG, Assistant Examiner